United States Patent
Yamamoto et al.

(10) Patent No.: US 6,873,066 B2
(45) Date of Patent: Mar. 29, 2005

(54) LINEAR MOTOR

(75) Inventors: Tomonaga Yamamoto, Fujiyoshida (JP); Takuya Maeda, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 0 days.

(21) Appl. No.: 10/425,971

(22) Filed: Apr. 30, 2003

(65) Prior Publication Data

US 2003/0227221 A1 Dec. 11, 2003

(30) Foreign Application Priority Data

Jun. 11, 2002 (JP) ........................................ 2002-169913

(51) Int. Cl.[7] .............................................. H02K 41/03
(52) U.S. Cl. ...................................................... 310/12
(58) Field of Search ............................. 310/12, 13, 14, 310/156.48–156.52

(56) References Cited

U.S. PATENT DOCUMENTS 6,441,522 B1 * 8/2002 Scott ..................... 310/156.23
6,608,424 B2 * 8/2003 Kusase ....................... 310/263

FOREIGN PATENT DOCUMENTS

| DE | 198 29 052 | 12/1999 | .......... H02K/41/03 |
| EP | 1 164 684 | 12/2001 | ............ H02K/1/27 |
| JP | 03207256 | 9/1991 | .......... H02K/41/03 |
| JP | 06319250 | 11/1994 | .......... H02K/41/03 |
| JP | 09074733 | 3/1997 | .......... H02K/41/03 |

OTHER PUBLICATIONS

Linear–Motion Electrical Machines, E. R. Laithwaite and S. A. Nasar, Proceedings of the IEEE, vol. 58 No. 4, Apr. 1970.*

* cited by examiner

Primary Examiner—Darren Schuberg
Assistant Examiner—Judson H Jones
(74) Attorney, Agent, or Firm—Staas & Halsey LLP

(57) ABSTRACT

In a linear motor, magnetic poles on a stator (or moving element) and teeth on a moving element (or stator) face one another to form a gap. The gap-side surface of each of the magnetic poles or teeth has an external shape represented by a hyperbolic function or a reciprocal function of cosine. Thus, the cogging torque can be made lower than that of a conventional linear motor of which the magnetic poles (permanent magnets) or teeth have an external shape represented by a straight line, circular arc, parabola, or hyperbola.

38 Claims, 6 Drawing Sheets

LINEAR MOTOR

BACKGROUND OF THE INVENTION

1. Field of the Invention

The present invention relates to a linear motor, and more particularly, to a linear motor in which a gap portion is defined by magnetic poles or teeth having characteristic shapes.

2. Description of the Related Art

In a linear motor, magnetic poles on a stator (or moving element) and teeth on a moving element (or stator) face one another to form a gap. The cogging torque of the linear motor is settled depending on the shapes of the magnetic poles and the teeth that are opposed to the poles. In order to lower the cogging torque, therefore, various magnetic poles or teeth having special shapes have been proposed.

FIG. 11 shows a prior art example of a stator or moving element (slider) of which the magnetic poles are formed of permanent magnets. The stator or slider is constructed in a manner such that a plurality of permanent magnets 1 are arranged parallel to one another on a plate 10 that is formed of a magnetic material such as iron. If each permanent magnet 1 is cut in a direction parallel to the direction of relative movement of the slider with respect to the stator, in the example shown in FIG. 11, the gap-side external shape of its cross section is a straight line 31. Thus, the gap-side surface (the surface opposite the plate 10) of each magnet 1 is flat.

FIGS. 12 to 14 show alternative prior art examples of the stator or moving element of which the magnetic poles are formed of permanent magnets. If each of permanent magnets 1 that are arranged side by side on a plate 10 is cut in a direction parallel to the direction of relative movement of the slider with respect to the stator, in the example shown in FIG. 12, the gap-side external shape of its cross section is a circular arc 32. Likewise, in the example shown in FIG. 13, the gap-side external shape of the cross section of each permanent magnet 1 is a parabola 33. In the example shown in FIG. 14, the gap-side external shape of the cross section of each permanent magnet 1 is a hyperbola 34.

As described above with reference to FIGS. 11 to 14, many attempts have been made to vary the shapes of the magnetic poles to lower the cogging torque.

OBJECT AND SUMMARY OF THE INVENTION

The object of the present invention is to provide a linear motor of which the cogging torque is lower than that of a conventional linear motor.

A linear motor of the present invention is designed so that the external shape of the gap-side surface of each magnetic pole and/or tooth forming a gap portion consists mainly of a shape represented by a hyperbolic function or a reciprocal function of cosine in trigonometric function. More specifically, the whole or a part of the external shape of the gap-side surface or its central portion is a shape represented by a hyperbolic function or a reciprocal function of cosine in trigonometric function.

The hyperbolic function is given by $$R = A - B^*(e^{C\theta} + e^{-C\theta}),$$

where R is the distance from a certain point on the center line of each magnetic pole or each tooth opposite thereto, θ is the angle to the center line, A, B and C are constants, and e is the base of a natural logarithm or a constant. Alternatively, the hyperbolic function, in an XY coordinate system in which the central axis of each magnetic pole or each tooth opposite thereto is the X-axis, an axis perpendicular to the X-axis is the Y-axis, and the point of intersection of the X- and Y-axes is the origin, is given by $$X = A - B^*(e^{CY} + e^{-CY}),$$

where A, B and C are constants, and e is the base of a natural logarithm or a constant.

Alternatively, moreover, the reciprocal function of cosine in trigonometric function is given by $$R = A - B/\cos(C\theta),$$

where R is the distance from a certain point on the center line of each magnetic pole or each tooth opposite thereto, θ is the angle to the center line, and A, B and C are constants. Alternatively, furthermore, the reciprocal function of cosine in trigonometric function, in an XY coordinate system in which the central axis of each magnetic pole or each tooth opposite thereto is the X-axis and an axis perpendicular to the X-axis is the Y-axis, and the point of intersection of the X- and Y-axes is the origin, is given by $$X = A - B/\cos(CY),$$

where A, B and C are constants.

Further, rows of points on the external shape represented by the aforesaid function are connected by means of a straight or curved line.

With the above construction, the cogging torque of the motor according to the present invention can be made lower than that of a conventional motor.

DETAILED DESCRIPTION OF THE PREFERRED EMBODIMENTS

Figure 1:
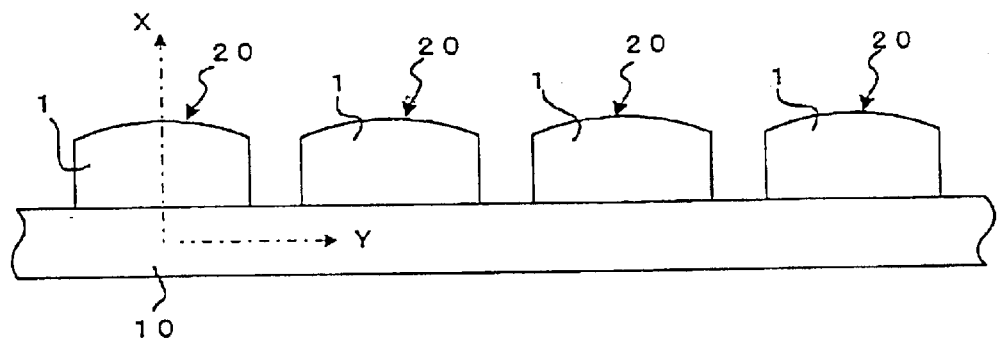
FIG. 1 is a view illustrating a stator or slider according to a first embodiment of the invention, of which the magnetic poles are formed of permanent magnets.

FIG. 1 is a view illustrating a stator or slider (moving element) according to a first embodiment of the present invention, of which the field poles are formed of permanent magnets.

The stator or slider is constructed in a manner such that a plurality of permanent magnets 1 to form the magnetic poles are arranged parallel to one another on a plate 10 that is formed of a magnetic material such as iron. An external shape 20 of the cross section of each permanent magnet 1 on the gap side (the side opposite the plate 10) can be represented by a hyperbolic function according to this embodiment.

Thus, when the permanent magnets 1 are cut in the direction of their arrangement, that is, in the direction parallel to the relative movement of the slider with respect to the stator (horizontal direction of FIG. 1), the gap-side external shape 20 of the cross section of each permanent magnet 1 can be represented by a hyperbolic function.

A center line indicated by dashed line in FIG. 1 is supposed to be the X-axis. This line passes through the center of the cross section of each permanent magnet 1 and extends in the vertical direction (direction in which the magnetic poles face teeth across a gap). Thereupon, the hyperbolic function can be given by $$R = A - B*(e^{C\theta} + e^{-C\theta}), \quad (1)$$

where R is the distance from a certain point on the X-axis, θ is the angle to the X-axis, A, B and C are constants, and e is the base of a natural logarithm or a constant.

If an axis that horizontally extends at right angles to the X-axis (in the direction of relative movement of the slider with respect to the stator) is the Y-axis, FIG. 1 shows the respective cross sections of the permanent magnets 1 on the XY-plane. In this XY coordinate system, the aforesaid hyperbolic function is given by $$X = A - B*(e^{CY} + e^{-CY}), \quad (2)$$

where A, B and C are constants, and e is the base of a natural logarithm or a constant.

As seen from equation (2), X has its maximum when Y is zero. In other words, X=A−2B is obtained when Y=0 is given. Thus, the vertex of each permanent magnet 1 shown in FIG. 1 is on the X-axis, and the origin (0, 0) of the XY coordinate system is in a position on the X-axis that is lower than the vertex by (A−2B).

The cogging torque can be lessened by creating the shape 20 represented by the hyperbolic function given by equation (1) or (2) over the whole surface of each permanent magnet 1 that faces the gap. Alternatively, the cogging torque can be lessened by creating the same shape only over the region near the vertex of each permanent magnet 1 (central region covering the X-axis).

Figure 2:
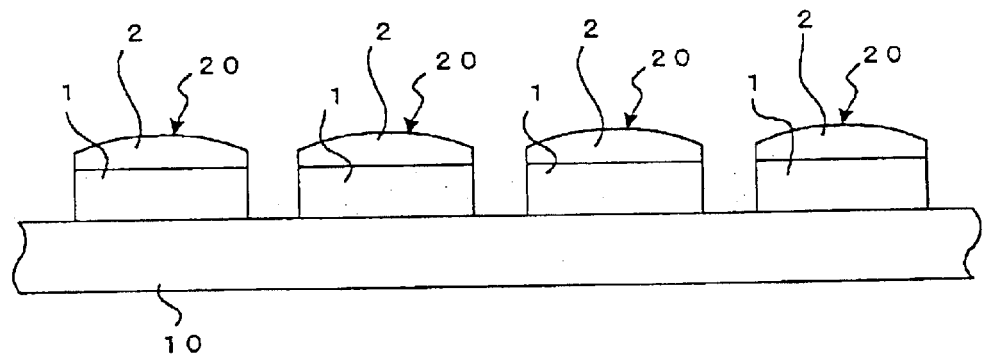
FIG. 2 is a view illustrating a stator or slider according to a second embodiment of the invention, of which the magnetic poles are formed of permanent magnets.

FIG. 2 is a view illustrating a stator or slider according to a second embodiment of the invention, of which the field poles are formed of permanent magnets. In this embodiment, a core 2 is bonded to the top of each permanent magnet 1, as shown in FIG. 2. The combined cross section of the magnet 1 and the core 2 has the same shape with the cross section of each permanent magnet 1 shown in FIG. 1. Thus, the gap-side external shape 20 of the cross section of the core 2 can be represented by the aforesaid hyperbolic function. This embodiment has the same construction with the first embodiment shown in FIG. 1 except for the shape of the cross section of each permanent magnet 1.

Figure 3:
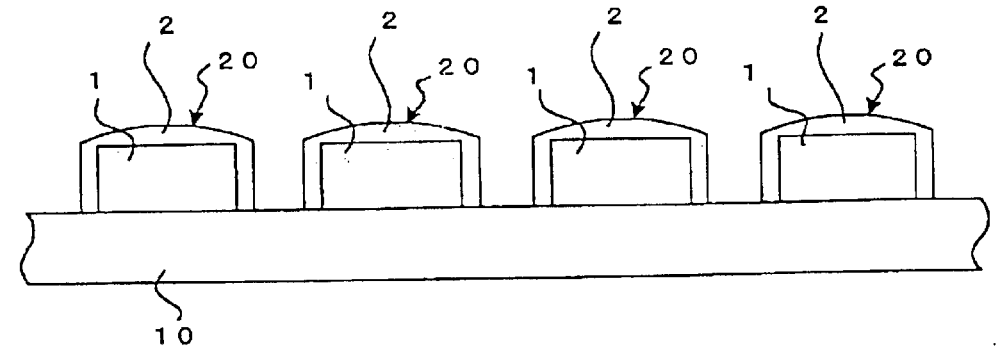
FIG. 3 is a view illustrating a stator or slider according to a third embodiment of the invention, of which the magnetic poles are formed of permanent magnets.

FIG. 3 is a view illustrating a stator or slider according to a third embodiment of the invention, of which the field poles are formed of permanent magnets. In this embodiment, a core 2 covers each permanent magnet 1, as shown in FIG. 3. The cross section of the covered magnet 1 has the same shape with that of each permanent magnet 1 shown in FIG. 1. Thus, the gap-side external shape 20 of the cross section of the core 2 can be represented by the aforesaid hyperbolic function. This embodiment has the same construction with the first embodiment shown in FIG. 1 except for the shape of the cross section of each permanent magnet 1.

Figure 4:
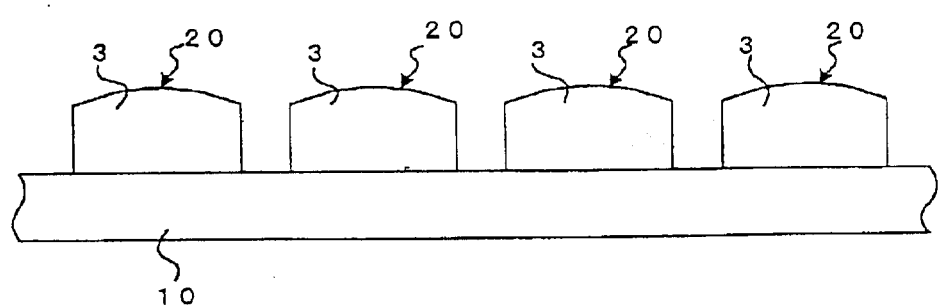
FIG. 4 is a view illustrating a stator or slider on the non-exciting side according to a fourth embodiment of the invention, in which a linear motor is formed of a reluctance-type motor.

FIG. 4 is a view illustrating a fourth embodiment of the invention, in which a linear motor is formed of a reluctance-type motor, and shows the configuration of teeth of a stator or slider on the no-coil side (secondary side) to which no power is supplied. For the stator or slider that constitutes the linear motor, the side to which power is supplied is referred to as the primary side, and the side to which no power is supplied is referred to as the secondary side, hereinafter.

In the case of the reluctance-type motor, teeth 3 on the secondary side are formed of cores. In the linear motor of the fourth embodiment, the gap-side external shape 20 of the cross section of each tooth 3 that is formed of a core is represented by the aforesaid hyperbolic function. Thus, the cross section of each tooth 3 shown in FIG. 4 resembles that of each permanent magnet 1 shown in FIG. 1 (first embodiment).

In the first to fourth embodiments described above, the cogging torque can be lessened by creating the shape 20 represented by the hyperbolic function given by equation (1) or (2) over the whole surface of each magnetic pole (permanent magnet 1) or tooth 3 that faces the gap. Alternatively, the cogging torque can be lessened by creating the same shape only over the region near the vertex of the aforesaid surface (central region covering the X-axis).

FIGS. 5 to 8 are views illustrating stators or sliders according to fifth to eighth embodiments of the invention, respectively, of which the magnetic poles are formed of permanent magnets. In the first to fourth embodiments described above, the external shape of the cross section of each magnetic pole or tooth that faces the gap of the motor can be represented by the hyperbolic function given by equation (1) or (2). In the fifth to eighth embodiments, on the other hand, the cross section has an external shape represented by a reciprocal function of cosine in trigonometric function in place of the hyperbolic function.

Figure 5:
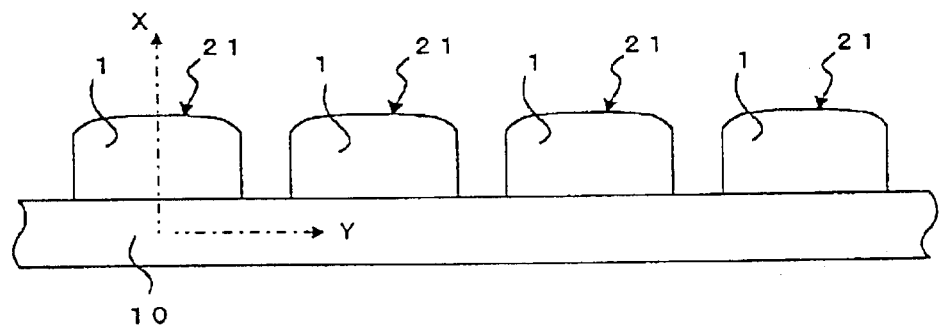
FIG. 5 is a view illustrating a stator or slider according to a fifth embodiment of the invention, of which the magnetic poles are formed of permanent magnets.

In the fifth embodiment shown in FIG. 5, an external shape 21 of the cross section of each permanent magnet 1 that constitutes a magnetic pole can be represented by a reciprocal function of cosine. This embodiment has the same construction with the first embodiment shown in FIG. 1 except for the shape of the cross section of each permanent magnet 1.

As in the case of FIG. 1, a center line that passes through the center of the cross section of each permanent magnet 1 and extends in the vertical direction (direction in which the magnetic poles face teeth across a gap) is supposed to be the X-axis. Further, a line that horizontally extends at right angles to the X-axis (in the direction of relative movement of the slider with respect to the stator) is supposed to be the Y-axis. Thereupon, FIG. 5 shows the respective cross sections of the permanent magnets 1 on the XY-plane. The gap-side external shape of the cross section of each permanent magnet 1 can be represented by a reciprocal function of cosine in trigonometric function of the following equation:

$$R = A - B/\cos(C\theta), \quad (3)$$

where R is the distance from a certain point on the X-axis, θ is the angle to the X-axis, and A, B and C are constants.

Using the XY coordinate system, moreover, the gap-side external shape of the cross section of each permanent magnet 1 can be represented by a reciprocal function of cosine in trigonometric function of the following equation:

$$X = A - B/\cos(CY), \quad (4)$$

Where A, B and C are constants. In equation (4), X has its maximum when Y is zero. In other words, X=A−B is obtained when Y=0 is given. Thus, the vertex of each permanent magnet 1 shown in FIG. 5 is on the X-axis, and the origin (0, 0) of the XY coordinate system is in a position on the X-axis that is lower than the vertex by (A−B).

Figure 6:
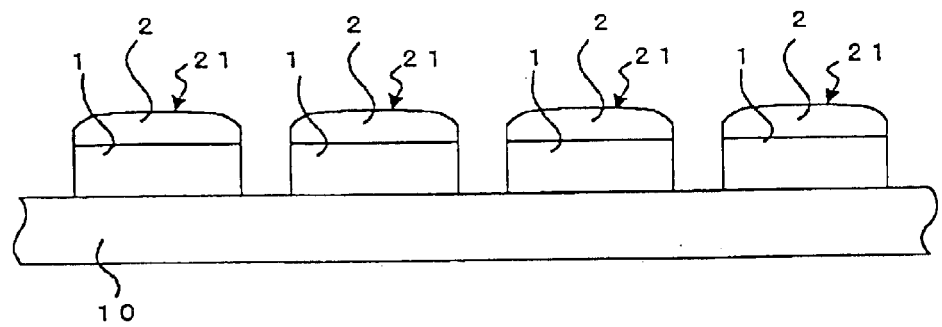
FIG. 6 is a view illustrating a stator or slider according to a sixth embodiment of the invention, of which the magnetic poles are formed of permanent magnets.

The sixth embodiment shown in FIG. 6 has the same construction with the fifth embodiment shown in FIG. 5 except that a core 2 is bonded to the top of each permanent magnet 1. The combined cross section of the magnet 1 and the core 2 has the same shape with the cross section of each permanent magnet 1 shown in FIG. 5. Thus, the gap-side external shape of the cross section of the core 2 can be represented by the reciprocal function of cosine in trigonometric function given by equation (3) or (4).

Figure 7:
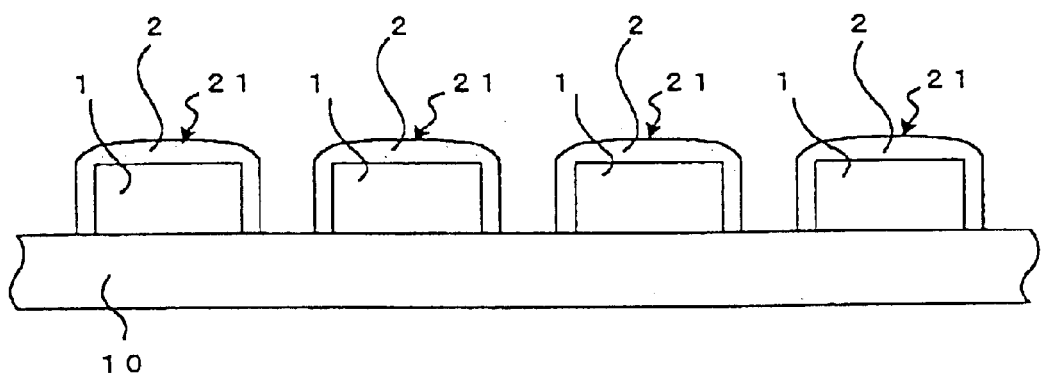
FIG. 7 is a view illustrating a stator or slider according to a seventh embodiment of the invention, of which the magnetic poles are formed of permanent magnets.

The seventh embodiment shown in FIG. 7 has the same construction with the fifth embodiment shown in FIG. 5 except that a core 2 covers each permanent magnet 1. The cross section of the covered magnet 1 has the same shape with that of each permanent magnet 1 shown in FIG. 5. Thus, the gap-side external shape 21 of the cross section of the core 2 can be represented by the reciprocal function of cosine in trigonometric function given by equation (3) or (4).

Figure 8:
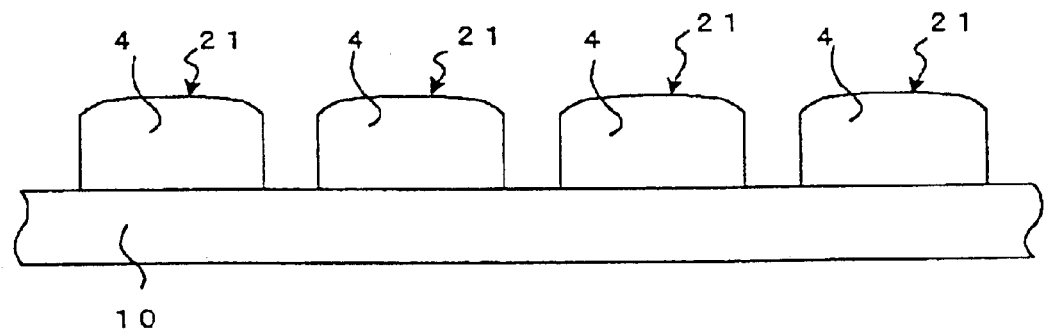
FIG. 8 is a view illustrating a stator or slider on the non-exciting side according to an eighth embodiment of the invention, in which a linear motor is formed of a reluctance-type motor.

In the eighth embodiment shown in FIG. 8, as in the fourth embodiment shown in FIG. 4, a reluctance-type linear motor has a stator or slider on its secondary side. This embodiment has the same construction with the fourth embodiment except for the shape of the cross section of each tooth 4. A gap-side external shape 21 of the cross section of each tooth 4 shown in FIG. 8 can be represented by the reciprocal function of cosine in trigonometric function given by equation (3) or (4).

In these embodiments shown in FIGS. 5 to 8, the cogging torque can be lessened by creating the shape 21 represented by the reciprocal function of cosine given by equation (3) or (4) over the whole surface of each magnetic pole (permanent magnet 1) or tooth 4 that faces the gap. Alternatively, the cogging torque can be lessened by creating the same shape only over the central region of each permanent magnet 1 or tooth 4 that covers the X-axis.

Each permanent magnet 1 shown in FIG. 1 or each tooth 3 shown in FIG. 4 is worked so that its cross section has the gap-side external shape 20 represented by the hyperbolic function. Alternatively each permanent magnet 1 shown in FIG. 5 or each tooth 4 shown in FIG. 8 is worked so that its cross section has the gap-side external shape 21 represented by the reciprocal function of cosine in trigonometric function. In doing this, a plurality of points set on the shape 20 or 21 are connected by means of a straight or curved line. If the cross section of each core 2 has the gap-side external shape 20 represented by the hyperbolic function or the shape 21 represented by the reciprocal function of cosine in trigonometric function, as in the embodiment shown in FIG. 2, 3, 6 or 7, the shape 20 or 21 is created by successively laminating thin steel sheets to one another.

To examine the advantage effect of the present invention, a test was conducted to compare the prior art example in which the external shape of each magnetic pole or tooth is a straight line, circular arc, parabola, or hyperbola, the first embodiment of the invention shown in FIG. 1 in which the external shape of each magnetic pole or tooth can be represented by a hyperbolic function, and the alternative embodiment shown in FIG. 5 in which the external shape of each magnetic pole or tooth can be represented by a reciprocal function of cosine in trigonometric function.

Figure 9:
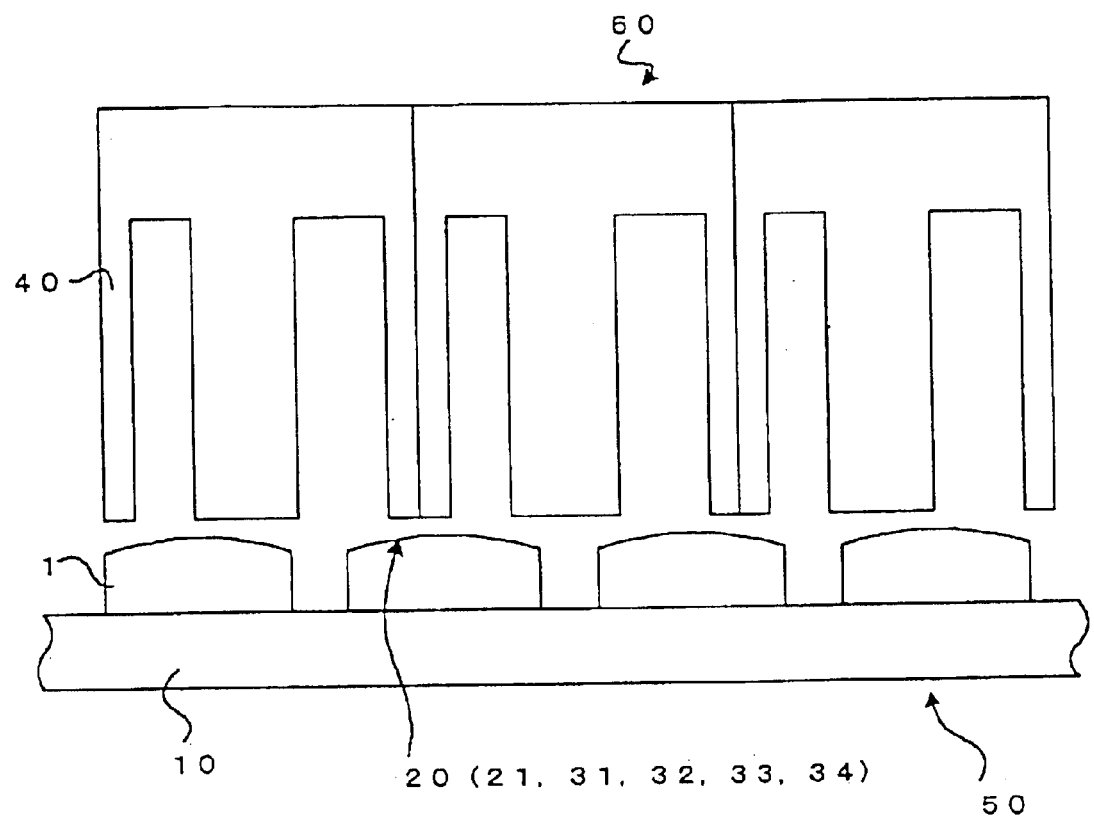
FIG. 9 is a view showing a model configuration for linear motors for the comparison of cogging torques generated in the linear motors of the invention and a conventional linear motor.

FIG. 9 shows a common configuration for tested linear motors. In FIG. 9, a slider 60 is on the primary side (power supply side), and a stator 50 is on the secondary side. The stator 50 is formed of a plurality of permanent magnets 1 arranged side by side on the plate 10. The slider 60 is provided with core teeth 40 wound with a coil. The coil to be wound on the teeth 40 is not shown in FIG. 9.

Figure 11:
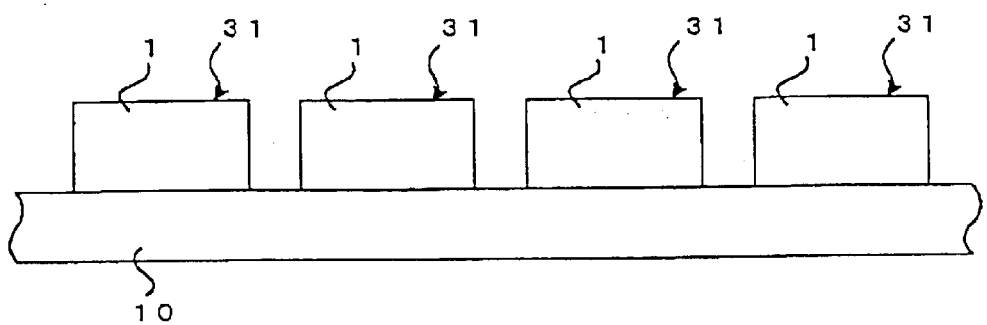
FIG. 11 is a view illustrating a stator or slider of a conventional linear motor of which the cross section of each magnetic pole has a straight external shape.
Figure 12:
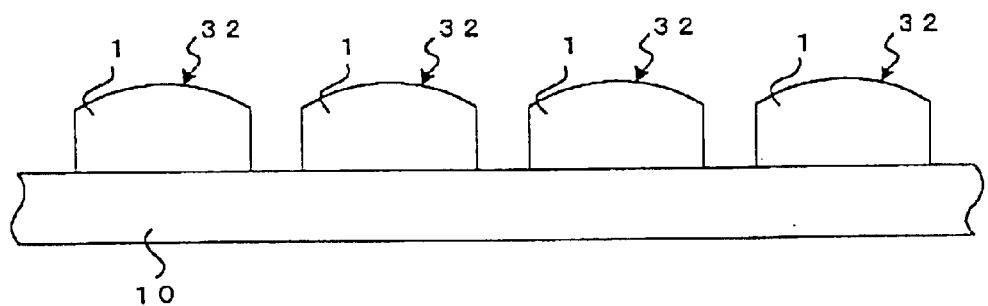
FIG. 12 is a view illustrating a stator or slider of a conventional linear motor of which the cross section of each magnetic pole has a circular external shape.
Figure 13:
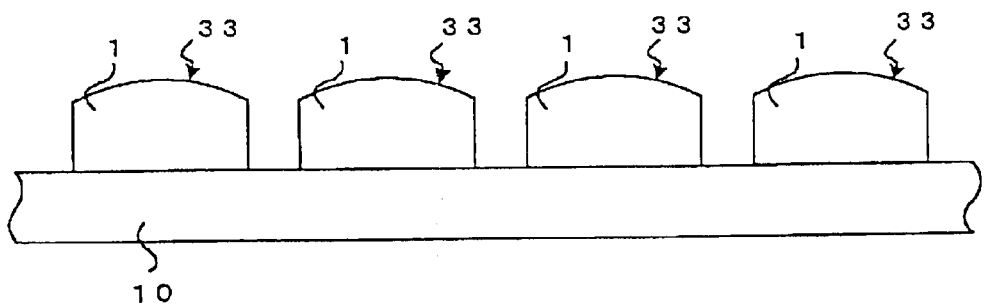
FIG. 13 is a view illustrating a stator or slider of a conventional linear motor of which the cross section of each magnetic pole has a parabolic external shape.
Figure 14:
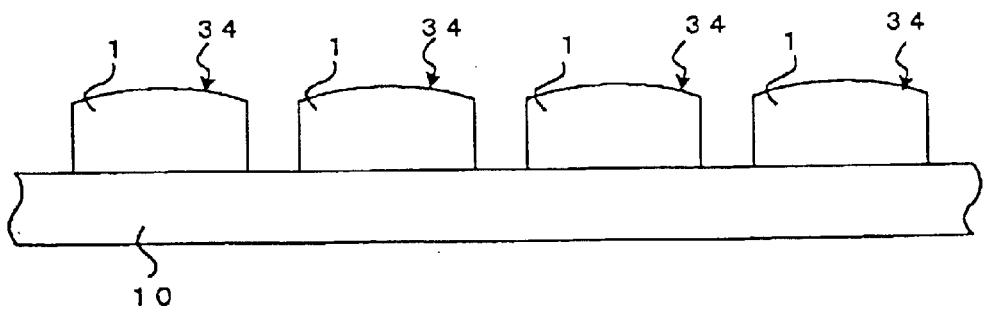
FIG. 14 is a view illustrating a stator or slider of a conventional linear motor of which the cross section of each magnetic pole has a hyperbolic external shape.

The depth of each permanent magnet (magnetic pole) 1 (in the direction perpendicular to the drawing plane in FIGS. 1, 5, 11, 12 and 13) is fixed, and the gap between the stator 50 and the slider 60 (gap between the vertex of each permanent magnet 1 and the distal end of each corresponding tooth 40 in FIG. 9) is also fixed. Further, the maximum height of each permanent magnet 1 (distance from the upper surface of the plate 10 to the vertex of each magnet 1) and its volume are fixed. However, only the gap is fixed for each permanent magnet 1 of which the cross section has a straight gap-side external shape, as shown in FIG. 11.

Figure 10:
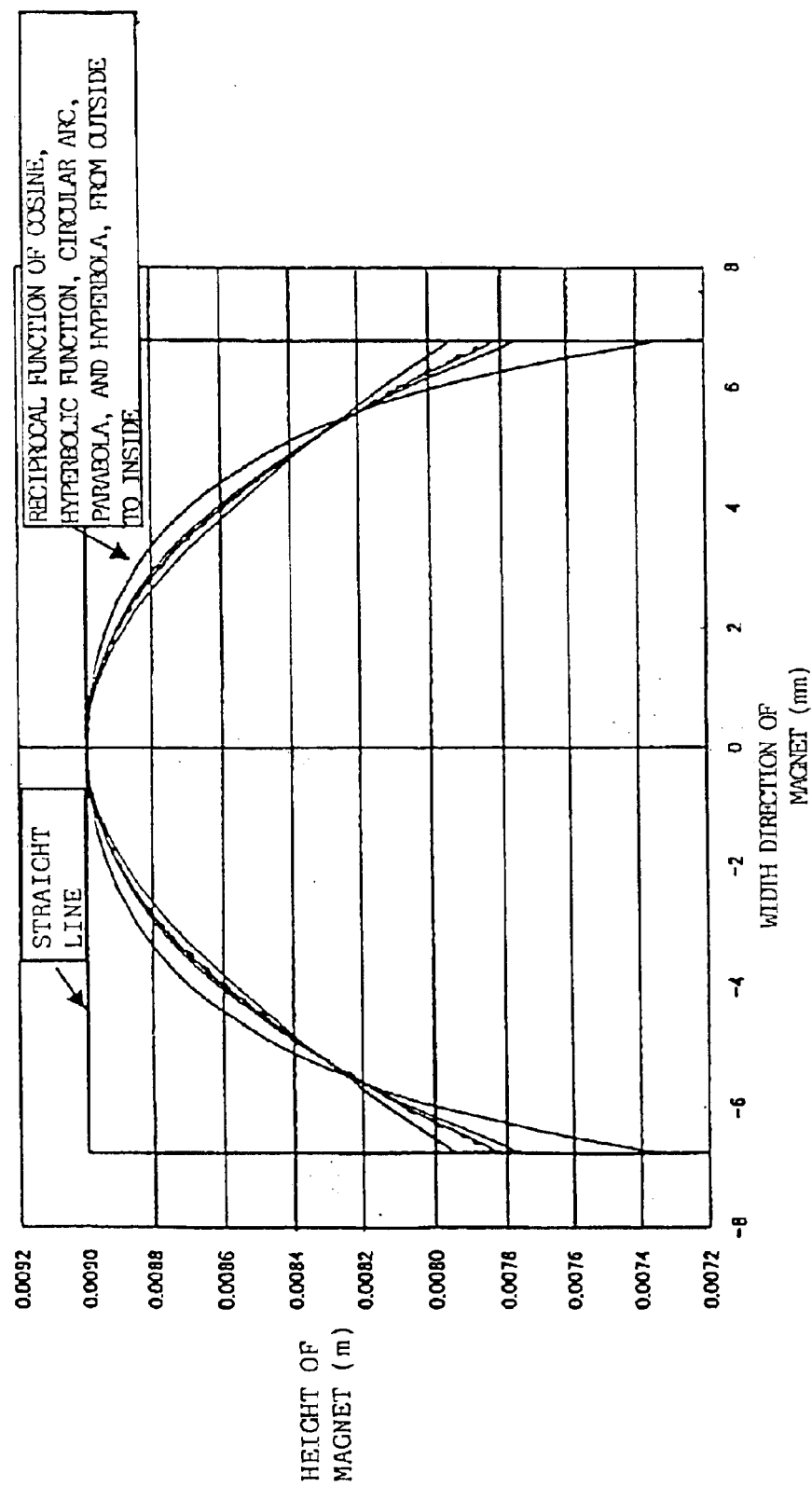
FIG. 10 is a diagram showing external shapes of magnetic poles for comparison.

FIG. 10 shows the gap-side external shapes of the respective cross sections of these magnetic poles (permanent magnets) for comparison. In FIG. 10, shapes represented by a reciprocal function of cosine in trigonometric function, hyperbolic function, circular arc, parabola (broken line), and hyperbola are drawn ranging from outside to inside in the order named. The shapes represented by the circular arc and the parabola (broken line) are substantially coincident with each other.

The following table shows the result of measurement of cogging torque. The cogging torque is given in Newton (N), a unit of force, and the ratio is based on the shape represented by the hyperbolic function.

| External shape of magnetic pole: | Cogging torque: | Ratio |
| --- | --- | --- |
| Reciprocal function of cosine | 25.0 N | −16.2% |
| Hyperbolic function | 29.8 N | 0 |
| Circular arc | 31.0 N | +3.9% |
| Parabola | 31.7 N | +6.5% |
| Hyperbola | 35.2 N | +18.0% |
| Straight line | 89.6 N | 201.0% |

Thus, the cogging torque has its minimum when the magnetic poles have an external shape represented by the reciprocal function of cosine in trigonometric function. The second lowest cogging torque is obtained with use of an external shape represented by the hyperbolic function.

As mentioned before, the gap-side external shape of the cross section of each magnetic pole or tooth, cut in a direction parallel to the direction of relative movement of the slider with respect to the stator, may be the shape represented by the reciprocal function of cosine in trigonometric function or the hyperbolic function throughout the area. Since the peripheral region of each magnetic pole or tooth has a small influence, however, the same effect can be obtained by only using the shape represented by the reciprocal function of cosine in trigonometric function or the hyperbolic function for the central region near the vertex of each magnetic pole or tooth.

According to the embodiments described above, each magnetic pole or tooth on the secondary side has an external shape represented by the reciprocal function of cosine in trigonometric function or the hyperbolic function. However, the same effect can be obtained by using the shape represented by the reciprocal function of cosine in trigonometric function or the hyperbolic function for the external shape of each tooth or magnetic pole on the primary side. In this case, each magnetic pole or tooth on the secondary side may be formed having the straight shape shown in FIG. 11. Alternatively, each magnetic pole or tooth on either of the primary and secondary sides may be formed having an external shape represented by the reciprocal function of cosine in trigonometric function or the hyperbolic function.

What is claimed is:

1. A linear motor wherein the external shape of the gap-side surface of each magnetic pole and/or tooth forming a gap portion consists mainly of a shape represented by a hyperbolic cosine function, wherein a cogging force of the linear motor is reduced based on the external shape of the gap-side surface of each magnetic pole and/or tooth.

2. The linear motor according to claim 1, wherein the magnetic pole and/or tooth is machined in a manner such that rows of points on the external shape thereof are connected by means of a straight or curved line.

3. A linear motor wherein the whole or a part of the external shape of the gap-side surface of each magnetic pole and/or tooth forming a gap portion is a shape represented by a hyperbolic cosine function, wherein a cogging force of the linear motor is reduced based on the external shape of the gap-side surface of each magnetic pole and/or tooth.

4. The linear motor according to claim 3, wherein the magnetic pole and/or tooth is machined in a manner such that rows of points on the external shape thereof are connected by means of a straight or curved line.

5. A linear motor wherein at least the central portion of the external shape of the gap-side surface of each magnetic pole and/or tooth forming a gap portion has a shape represented by a hyperbolic cosine function, wherein a cogging force of the linear motor is reduced based on the external shape of the gap-side surface of each magnetic pole and/or tooth.

6. The linear motor according to claim 5, wherein the magnetic pole and/or tooth is machined in a manner such that rows of points on the external shape thereof are connected by means of a straight or curved line.

7. A linear motor wherein the external shape of the gap-side surface of each magnetic pole and/or tooth forming a gap portion consists mainly of a shape represented by a hyperbolic cosine curve, wherein the hyperbolic cosine curve is given by $$R = A - B^*(e^{C\theta} + e^{-C\theta}),$$

where R is the distance from a certain point on the center line of each magnetic pole or each tooth opposite thereto, $\theta$ is the angle to the center line, A, B, and C are constants, and e is the base of a natural logarithm or a constant, wherein a cogging force of the linear motor is reduced based on the external shape of the gap-side surface of each magnetic pole and/or tooth.

8. The linear motor according to claim 7, wherein the magnetic pole and/or tooth is machined in a manner such that rows of points on the external shape thereof are connected by means of a straight or curved line.

9. A linear motor wherein the external shape of the gap-side surface of each magnetic pole and/for tooth forming a gap portion consists mainly of a shape represented by a hyperbolic cosine curve, wherein the hyperbolic cosine curve, in an XY coordinate system in which that the central axis of each magnetic pole or each tooth opposite thereto is the X-axis, an axis perpendicular to the X-axis is the Y-axis, and the point of intersection of the X- and Y-axes is the origin, is given by $$X = A - B^*(e^{CY} + e^{-CY}),$$

where A, B, and C are constants, X is a point on the X-axis, Y is a point on the Y-axis, and e is the base of a natural logarithm or a constant, wherein a cogging force of the linear motor is reduced based on the external shape of the gap-side surface of each magnetic pole and/or tooth.

10. The linear motor according to claim 9, wherein the magnetic pole and/or tooth is machined in a manner such that rows of points on the external shape thereof are connected by means of a straight or curved line.

11. A linear motor characterized in that the external shape of the gap-side surface of each magnetic pole and/or tooth forming a gap portion consists mainly of a shape represented by a reciprocal function of a cosine function.

12. The linear motor according to claim 11, wherein the reciprocal function of the cosine function is given by, $$R = A - B/\cos(C\theta),$$

where R is the distance from a certain point on the center line of each magnetic pole or each tooth opposite thereto, $\theta$ is the angle to the center line, and A, B and C are constants.

13. The linear motor according to claim 11, wherein the reciprocal function of the cosine function, in an XY coordinate system in which the central axis of each magnetic pole or each tooth opposite thereto is the X-axis, an axis perpendicular to the X-axis is the Y-axis, and the point of intersection of the X- and Y-axes is the origin, is given by $$X = A - B/\cos(CY)$$

where A, B and C are constants, X is a point on the X-axis, and Y is a point on the Y-axis.

14. The linear motor according to claim 11, wherein the magnetic pole and/or tooth is machined in a manner such that rows of points on the external shape thereof are connected by means of a straight or curved line.

15. The linear motor according to claim 12, wherein the magnetic pole and/or tooth is machined in a manner such that rows of points on the external shape thereof are connected by means of a straight or curved line.

16. The linear motor according to claim 13, wherein the magnetic pole and/or tooth is machined in a manner such that rows of points on the external shape thereof are connected by means of a straight or curved line.

17. A linear motor characterized in that the whole or a part of the external shape of the gap-side surface of each magnetic pole and/or tooth forming a gap portion is a shape represented by a reciprocal function of a cosine function.

18. The linear motor according to claim 17, wherein the reciprocal function of the cosine function is given by $$R=A-B/\cos(C\theta),$$

where R is the distance from a certain point on the center line of each magnetic pole or each tooth opposite thereto, θ is the angle to the center line, and A, B and C are constants.

19. The linear motor according to claim 17, wherein the reciprocal function of the cosine function, in an XY coordinate system in which the central axis of each magnetic pole or each tooth opposite thereto is the X-axis, an axis perpendicular to the X-axis is the Y-axis, and the point of intersection of the X- and Y-axes is the origin, is given by $$X=A-B/\cos(CY),$$

where A, B and C are constants, X is a point on the X-axis, and Y is a point on the Y-axis.

20. The linear motor according to claim 17, wherein the magnetic pole and/or tooth is machined in a manner such that rows of points on the external shape thereof are connected by means of a straight or curved line.

21. The linear motor according to claim 18, wherein the magnetic pole and/or tooth is machined in a manner such that rows of points on the external shape thereof are connected by means of a straight or curved line.

22. The linear motor according to claim 19, wherein the magnetic pole and/or tooth is machined in a manner such that rows of points on the external shape thereof are connected by means of a straight or curved line.

23. A linear motor characterized in that at least the central portion of the external shape of the gap-side surface of each magnetic pole and/or tooth forming a gap portion is a shape represented by a reciprocal function of a cosine function.

24. The linear motor according to claim 23, wherein the reciprocal function of the cosine function is given by $$R=A-B/\cos(C\theta),$$

where R is the distance from a certain point on the center line of each magnetic pole or each tooth opposite thereto, θ is the angle to the center line, and A, B and C are constants.

25. The linear motor according to claim 23, wherein the reciprocal function of the cosine function, in an XY coordinate system in which the central axis of each magnetic pole or each tooth opposite thereto is the X-axis, an axis perpendicular to the X-axis is the Y-axis, and the point of intersection of the X- and Y-axes is the origin, is given by $$X=A-B/\cos(CY),$$

where A, B and C are constants, X is a point on the X-axis, and Y is a point on the Y-axis.

26. The linear motor according to claim 23, wherein the magnetic pole and/or tooth is machined in a manner such that rows of points on the external shape thereof are connected by means of a straight or curved line.

27. The linear motor according to claim 24, wherein the magnetic pole and/or tooth is machined in a manner such that rows of points on the external shape thereof are connected by means of a straight or curved line.

28. The linear motor according to claim 25, wherein the magnetic pole and/or tooth is machined in a manner such that rows of points on the external shape thereof are connected by means of a straight or curved line.

29. A linear motor of which the magnetic poles are formed by bonding cores to the top of permanent magnets or covering permanent magnets with cores, each said core being formed by laminating a plurality of steel sheets to one another, the cross section of the core having an external shape represented by a hyperbolic cosine function or a reciprocal function of a cosine function.

30. A linear motor wherein a whole or a part of the external shape of the gap-side surface of each magnetic pole and/or tooth forming a gap portion is a shape represented by a hyperbolic cosine curve, wherein the hyperbolic cosine curve is given by $$R=A-B*(e^{C\theta}+e^{-C\theta}),$$

where R is the distance from a certain point on the center line of each magnetic pole or each tooth opposite thereto, θ is the angle to the center line, A, B and C are constants, and e is the base of a natural logarithm or a constant, wherein a cogging force of the linear motor is reduced based on the external shape of the gap-side surface of each magnetic pole and/or tooth.

31. The linear motor according to claim 30, wherein the magnetic pole and/or tooth is machined in a manner such that rows of points on the external shape thereof are connected by means of a straight or curved line.

32. A linear motor wherein at least a central portion of the external shape of the gap-side surface of each magnetic pole and/or tooth forming a gap portion has a shape represented by a hyperbolic cosine curve, wherein the hyperbolic cosine curve is given by $$R=A-B*(e^{C\theta}+e^{-C\theta}),$$

where R is the distance from a certain point on the center line of each magnetic pole or each tooth opposite thereto, θ is the angle to the center line, A, B and C are constants, and e is the base of a natural logarithm or a constant, wherein a cogging force of the linear motor is reduced based on the external shape of the gap-side surface of each magnetic pole and/or tooth.

33. The linear motor according to claim 32, wherein the magnetic pole and/or tooth is machined in a manner such that rows of points on the external shape thereof are connected by means of a straight or curved line.

34. A linear motor wherein a whole or a part of the external shape of the gap-side surface of each magnetic pole and/or tooth forming a gap portion is a shape represented by a hyperbolic cosine curve, wherein the hyperbolic cosine curve, in an XY coordinate system in which that the central axis of each magnetic pole or each tooth opposite thereto is the X-axis, an axis perpendicular to the X-axis is the Y-axis, and the point of intersection of the X- and Y-axes is the origin, is given by $$X=A-B*(e^{CY}+e^{-CY}),$$

where A, B and C are constants, X is a point on the X-axis, Y is a point on the Y-axis, and e is the base of a natural logarithm or a constant, wherein a cogging force of the linear motor is reduced based on the external shape of the gap-side surface of each magnetic pole and/or tooth.

35. The linear motor according to claim 34, wherein the magnetic pole and/or tooth is machined in a manner such that rows of points on the external shape thereof are connected by means of a straight or curved line.

36. A linear motor wherein at least a central portion of the external shape of the gap-side surface of each magnetic pole and/or tooth forming a gap portion has a shape represented by a hyperbolic cosine curve, wherein the hyperbolic cosine curve, in an XY coordinate system in which that the central axis of each magnetic pole or each tooth opposite thereto is the X-axis, an axis perpendicular to the X-axis is the Y-axis, and the point of intersection of the X-and Y-axes is the origin, is given by $$X = A - B*(e^{CY} + e^{-CY}),$$

where A, B and C are constants, X is a point on the X-axis, Y is a point on the Y-axis, and e is the base of a natural logarithm or a constant, wherein a cogging force of the linear motor is reduced based on the external shape of the gap-side surface of each magnetic pole and/or tooth.

37. The linear motor according to claim 36, wherein the magnetic pole and/or tooth is machined in a manner such that rows of points on the external shape thereof are connected by means of a straight or curved line.

38. A slider of a linear motor, comprising:

a magnetically permeable base;

a plurality of magnetic poles coupled with the base such that each pole is arranged in parallel with respect to every other pole, wherein an external shape of a gap-side surface of each magnetic pole comprises a shape represented by one of a hyperbolic cosine function or a reciprocal function of a cosine function, wherein a cogging force of the linear motor is reduced based on the external shape of the gap-side surface of each magnetic pole.

* * * * *